United States Patent [19]

Krøyer et al.

[11] 3,942,966

[45] Mar. 9, 1976

[54] METHODS OF PREPARING CERAMIC MATERIAL

[75] Inventors: Karl Kristian Kobs Krøyer; Tage Fredsted, both of Aarhus-Viby; Gunnar Brocks, Holmstrup, all of Denmark

[73] Assignee: Karl Kristian Kobs Kroyer, Aarhus-Viby J., Denmark

[22] Filed: Apr. 19, 1973

[21] Appl. No.: 352,686

[30] Foreign Application Priority Data
Apr. 21, 1972 United Kingdom............... 18645/72
Jan. 12, 1973 United Kingdom................. 1781/73

[52] U.S. Cl. ........................... 65/33; 65/18; 65/19; 106/48; 106/52
[51] Int. Cl.² ........................................... C03C 3/22
[58] Field of Search........ 65/19, 33, 18, 21; 106/48, 106/52

[56] References Cited
UNITED STATES PATENTS
3,377,660   4/1968   Marshall et al...................... 106/48
3,527,649   9/1970   Sullivan ................................ 106/48

FOREIGN PATENTS OR APPLICATIONS
7,142,115   12/1971   Japan.................................... 106/52

*Primary Examiner*—Arthur D. Kellogg
*Attorney, Agent, or Firm*—Watson Cole Grindle & Watson

[57] ABSTRACT

A method of preparing a ceramic material comprising the steps of forming a mixture of crystallizable glass frit particles and a silicate binder having a melting point of between 950 and 1,100°C, heating the mixture to melt the binder and to initiate crystallization of the crystallizable glass frit and cooling the heated mixture to room temperature.

7 Claims, No Drawings

METHODS OF PREPARING CERAMIC MATERIAL

BACKGROUND OF THE INVENTION

This invention relates to a novel method for making ceramic material. More particularly, the invention relates to building elements, such as bricks, and an aggregate material for road construction consisting of the ceramic material.

Lime sand bricks which are well known building elements have found widespread use within the building industry. Such bricks are prepared by subjecting a preformed mixture of sand and burned lime to a heat treatment at a temperature of about 200°C under a pressure of 14–16 atmospheres and in the presence of steam.

Improved lime sand bricks have been prepared by wholly or partially replacing the sand of the mixture by granulated devitrified glass. Such bricks present the advantage of being white whereas the normal lime sand bricks are greyish and of maintaining their whiteness even under wet conditions. However, the use of devitrified glass particles necessitates a relatively complicated procedure because the devitrified glass particles have to be prepared separately by a process comprising an initial preparation of glass frit and a subsequent heating and cooling of the frit to crystallize the frit.

It is also well known to use devitrified glass particles as an aggregate material in bituminous road surfacing materials.

The object of the invention is to provide a method for making ceramic material suitable for the production of building elements having improved properties compared to the prior art products by a simple process.

Another object of the invention is to provide a novel aggregate material for road construction imparting to road surfaces containing such aggregate material an increased skidresistance.

SUMMARY OF THE INVENTION

The ceramic material of the invention comprises particles of devitrified glass firmly bonded together by a binder consisting of solidified silicate melt, the binder having a melting point of between 950° and 1,100°C.

By using such a binder the separate production of devitrified glass particles can be avoided. Thus, if a mixture of particles of a glass frit and the binder is heated to a temperature of between 950° and 1,100°C, the binder melts and adheres to the surfaces of the glass frit particles. At the high temperatures in question the molten binder also reacts with the siliceous compounds of the glass frit particles.

At the same time, however, a crystallization within the glass frit particles is initiated and the glass frit particles are converted into devitrified glass particles.

After cooling to room temperature the product obtained consists of devitrified glass particles firmly bonded together by the solidified silicate melt.

The mixture of glass frit particles and binder is preferably molded before firing so as to obtain fired products having predetermined dimensions. Such products are particularly suitable as building elements, such as bricks, because they combine the porosity and strength of the prior art lime sand bricks with high resistance to chemical attack and surface properties which make such elements repellent to dirt.

Thus, contrary to the prior art lime sand bricks which normally contain unreacted lime, the building elements of the invention are resistant to acids and are consequently more suitable for use in areas in which the air is contaminated with acid-reacting compounds, such as sulphur compounds.

Furthermore, since the building elements consisting of the ceramic material of the invention are composed of vitreous particles, dirt particles have a lower tendency to adhere to the surface of such building elements than to the surface of the prior art building elements.

The prior art production of colored sand lime bricks and devitrified glass lime bricks has been performed by mixing pigments into the mortar. This process is rather expensive, but what is even more important, the number of obtainable colors is rather restricted, and the appearance is dull and susceptible to alterations due to the weathering.

Also ordinary clay bricks can be obtained only with a limited number of colors.

By glazing clay bricks, various colors can be obtained, but this process is extremely expensive, and the glazed surface is airtight and therefore unable to breathe.

However, elements consisting of the ceramic material of the invention can be produced in almost any desired color. Thus, such elements can be produced in i.a. the light pastel shades which have been in great demand by modern architects during the recent years.

As indicated above the ceramic material of the invention is produced by the steps of forming a mixture of particles of crystallizable glass frit and a silicate binder having a melting point of between 950° and 1,100°C, heating the mixture to a temperature of between 950° and 1,100°C so as to melt the binder and initiate a crystallization of the glass frit particles and cooling the fired mixture to room temperature. The frit particles and the binder are preferably formed to obtain a desired shape before the shaped article is fired.

The shaped articles maintain their dimensions during heating to firing temperature and also during the subsequent cooling step. Therefore, the cooling can be performed at a higher rate than that of the normal building bricks.

A particularly suitable binder is water glass which is used in the form of an aqueous solution, such as a 36° Bé solution. When mixed with the glass frit particles, the water glass solution wets the particles and forms a thin coating on the surfaces of the particles. The provision of this coating ensures a firm bond between adjacent particles during the subsequent firing step.

Another preferred type of binder is finely divided glass, such as crushed waste glass. The small particles of such glass can be uniformly distributed in the mass of glass frit particles and ensure after heating and cooling of the mass strong bonds between the devitrified glass particles. In this manner waste glass which causes serious pollution problems can be economically utilized.

A special advantage of the method of the invention is that the ceramic articles can be prepared and given a desired color in one single operation.

Thus, if an enamel frit is applied to the shaped article before it is fired, the firing of the article will not only result in the obtaining of a strongly coherent mass but also in the formation of a glaze within the zones coated with the enamel frit. Thus, although the base material consisting of devitrified glass particles and binder is white, the surface of the articles can be given many different weather resistant colors.

By selecting a suitable enamel frit with a low viscosity, the color penetration will be good and will not interfere with the desired porosity of the articles.

A desired color can also be obtained by applying a suspension of one or more pigments in a water glass solution on to the surface of the shaped article before it is fired.

Instead of applying an enamel frit or a pigment suspension onto the surface of the shaped article, coloring substances can also be incorporated in the binder used, for example in a water glass solution.

The crystallizable glass frit preferably has the following composition:

| | | |
|---|---|---|
| $SiO_2$ | above 60 | % by weight |
| CaO + MgO | above 20 | % by weight and preferably |
| | above 25 | % by weight |
| $Al_2O_3$ | below 5 | % by weight |
| $K_2O + Na_2O$ | below 5 | % by weight |
| $Fe_2O_3$ | below 1 | % by weight |
| S | below 1 | % by weight |

The crystallizable glass frit is prepared by heating a mixture of the starting materials to a temperature of about 1,500°C and by quenching the product thus formed in water. The granular glass frit thus formed is preferably crushed to obtain particle sizes of between 0 and 2 mm before it is used for the production of the ceramic material of the invention.

The crushed glass frit particles may be partially replaced, i.e., in an amount up to 50% by weight, by particles of waste glass, such as crushed beer bottles and crushed window glass.

The amount of binder used depends on the particle size of the non-crystallizable glass material becuase the finely divided glass product acts as a binder.

Articles having a particularly high strength are obtained when two or more fractions of waste glass having different particle sizes are mixed with the glass frit material. In that case the small particles cement the larger particles together. Articles made from two or more fractions of colored glass particles also present the advantage of having an aesthetically pleasant appearance.

The strength of the articles can be improved by incorporating in the crystallizable glass frit substances which retard the crystallization thereof. By incorporating such substances an increased amount of binder melts before the crystallization takes place. As an example of such compounds $Al_2O_3$ can be mentioned. Thus, it may be desirable to add $Al_2O_3$ to the material used for the production of the glass frit in an amount of up to 2.5% by weight in excess of the amount which normally is required to obtain a crystallizable glass frit, viz. up to 5% by weight.

A similar effect can be obtained by adding to the glass frit particles a flux, such as lime, which catalyzes a melting at the surfaces of the glass frit.

The ceramic material of the invention is particularly suitable for use as an aggregate for road construction because particles of the ceramic material significantly increases the skid-resistance of road surfaces containing such aggregate material.

The aggregate material is preferably prepared from a mixture of crystallizable glass frit and binder which mixture is shaped so as to form a plate or a rod having a thickness similar to the diameter of the desired aggregate particles, e.g. about 12 mm.

The mixture may also be formed into briquettes or shaped in a press and the surface of the article thus formed is preferably embossed in a predetermined matter so as to facilitate the final crushing of the fired product. The shaped articles are then dried and fired at a temperature of 1,000°–1,200°C. After the firing the articles are crushed and sieved. The fine particles may be recycled to the mixing step.

In an alternative method the mixture of crystallizable glass frit and binder is granulated to form particles of shape and size similar to that of the desired final particles. After drying the particles thus formed are fired at a temperature of about 1,000°C preferably in a rotary kiln.

In a modified method the mixture of crystallizable glass frit and binder is molded or extruded so as to form plates, rods and the like and these articles are then dried. Subsequently, the dried articles are crushed to form particles having a shape and size corresponding to that of the desired final particles. These particles are finally fired preferably in a rotary kiln.

The aggregate particles thus prepared comprise conglomerates of crystallized glass particles which are firmly bonded together by the binder.

When the ceramic material is to be used as an aggregate material, part of the crystallizable glass frit particles used in admixture with the binder may be replaced by finely divided mineral particles, such as crushed waste glass or sand.

A satisfactory product for use as an aggregate material has been obtained from a mixture consisting of 70–75 parts by weight of crystallizable glass particles having a particle size of between 0 and 2 mm in admixture with fine particles having a particle size of between 0 and 140 $\mu$.

When incorporated into a road surfacing material the aggregate particles impart to the road surface a high skid-resistance. The skid-resistance is measured according to British Standard Method 812:67 and the skid-resistance is expressed in the term of its "Polished Stone Value" (P.S.V.). The aggregate material of the invention has P.S.V.-values of the order of 70–75 and an Aggregate Abrasion Value (A.A.V.) of below 15 according to British Standard Method 812:1972.

DESCRIPTION OF THE PREFERRED EMBODIMENTS

The invention will now be described in further detail with reference to the following non-limiting examples.

EXAMPLE 1

The following materials were mixed:

| | |
|---|---|
| Waste glass (beer bottles) having a particle size of up to 2 mm | 40% by weight |
| Crystallizable glass frit having a particle size of up to 2 mm | 40% by weight |
| Crystallizable glass frit having a particle size of up to 160 $\mu$ | 20% by weight |

10 ml water glass solution having a concentration of 36° Bé were added per 100 g of the mixture. The mixture thus obtained was shaped to form a plate and the plate thus formed was coated with a chromium oxide enamel. The coated plate was then fired at a temperature of 1,050°C. A plate comprising a white base material and a green surface was formed.

The crystallizable glass frit had been prepared from a glass frit having the following composition:

| | | |
|---|---|---|
| $SiO_2$ | 70 | % by weight |
| CaO | 23 | % by weight |
| MgO | 2 | % by weight |
| $Al_2O_3$ | 3 | % by weight |
| $Fe_2O_3$ | 0.3 | % by weight |
| $Na_2O + K_2O$ | 1.7 | % by weight |

EXAMPLE 2

The following materials were mixed:

| | |
|---|---|
| Crystallizable glass frit having a particle size of up to 2 mm | 90% by weight |
| Waste glass powder (beer bottles) having a particle size of up to 160 $\mu$ | 10% by weight |

5 ml water glass solution having a concentration of 36° Bé and 5 ml water were added per 100 g of the mixture. The mixture thus obtained was shaped to form a plate and the plate was coated and burned in the manner set forth in Example 1. A plate having similar colors was obtained.

EXAMPLE 3

The following materials were mixed:

| | |
|---|---|
| Crystallizable glass frit having a particle size of up to 2 mm | 70% by weight |
| Waste glass (window glass) having a particle size of up to 160 $\mu$ | 30% by weight |

5 ml glass solution having a concentration of 36° Bé and 5 ml water were added per 100 g of the mixture. The mixture was shaped to form a plate and the plate thus formed was coated with a basic zirconium oxide containing enamel containing 0.5% chromium oxide. The coated plate was fired at a temperature of 1,050°C, and the plate formed had a light green color.

EXAMPLE 4

The following materials were mixed:

| | |
|---|---|
| Crystallizable glass frit having a particle size of up to 2 mm | 80% by weight |
| Crystallizable glass frit having a particle size of up to 160 $\mu$ | 20% by weight |

10 ml water glass solution having a concentration of 36° Bé were added per 100 g of the mixture. The mixture was shaped to form a plate and fired at a temperature of about 1,050°C to form a white plate. The plate thus produced was treated with 1 N HCl at 20°C for 1 hour. A prior art lime sand brick containing devitrified glass particles as the sand component was subjected to a similar treatment. No weight loss could be observed in case of the product of the invention whereas the prior art product showed a weight loss of 2.2%.

EXAMPLE 5

A shaped plate was prepared as described in example 4 and was then coated with a mixture of a basic enamel containing zirconium oxide and a copper oxide containing enamel. The coated plate was then fired at a temperature of 1,050°C to form a white product having a turquise surface color.

EXAMPLE 6

A mixture consisting of 90% by weight of crystallizable glass frit particles having a particle size of up to 2 mm and 10% by weight of glass powder (beer bottles) having a particle size of up to 160 $\mu$ was prepared. 5 ml water glass solution of a concentration of 36° Bé and 5 ml water were added per 100 g of the mixture. The mixture thus prepared was shaped so as to form briquettes and the briquettes were fired at a temperature of 1050°C. After cooling, the briquettes were crushed and the material thus produced was sieved.

The material thus obtained has a P.S.V.-value of 73 and an A.A.V.-value of 6.5. The fraction having a particle size of 5–8 mm was used as an aggregate material (25% of the total amount of the aggregate) in an asphaltic concrete wearing course mix. 6 months after the construction of a road surface on the basis of the mix the coefficient of friction (sideway force coefficient) 0.8 at 80 km/h was measured and the light reflection properties of the road surface were found to be excellent.

EXAMPLE 7

A ceramic plate material prepared by the method described in example 4 was crushed and sieved. The P.S.V.-value was 71 and the A.A.V.-value was 7.4. The fraction having a particle size of between 12 and 16 mm was rolled into the surface of a hot-rolled asphalt road surface in an amount of 10 kg/m².

6 months later the coefficient of friction of said road surface was 0.75 at 80 km/h and the light reflection properties were excellent. No glaring was observed even during heavy rainfall.

We claim:

1. A method of preparing a ceramic material comprising particles of a devitrified glass and silicate binder selected from the group consisting of water-glass and finely divided glass, comprising the steps of: forming a mixture of particles of crystallizable glass frit and said silicate binder having a melting point of between 950° and 1,100°C, heating said mixture to a temperature of between 950° and 1,100° C so as to melt said silicate and initiate a crystallization of said glass frit, and cooling the fired mixture to room temperature; and wherein said silicate binder includes waste glass having a maximum particle size of substantially 2 mm and being substantially 40% by weight of said mixture, said crystallizable glass frit comprising a first crystallizable glass frit having a maximum particle size of substantially 2 mm and being 40% by weight of said mixture and a second crystallizable glass frit having a maximum particle size of 160 microns and being 20% by weight of said mixture, and further comprising the step of adding to said mixture a 10 ml water-glass solution having a concentration of substantially 36° Bé per 100 g of said mixture, shaping the mixture to form a plate, coating said plate with a chromium oxide enamel, and melting said coated plate at a temperature of substantially 1,050° C.

2. A method as in claim 1 wherein said first and second crystallizable glass frits have a composition of 70% by weight of $SiO_2$, 23% by weight of CaO, 2% by weight of MgO, 3% by weight of $Al_2O_3$, 0.3% by weight of $Fe_2O_3$, and 1.7% by weight of $Na_2O + K_2O$.

3. A method of preparing a ceramic material comprising particles of a devitrified glass and silicate binder selected from the group consisting of water-glass and finely divided glass, comprising the steps of: forming a mixture of particles of crystallizable glass frit and said silicate binder having a melting point of between 950° and 1,100° C, heating said mixture to a temperature of between 950° and 1,100° C so as to melt said silicate and initiate a crystallization of said glass frit, and cooling the fired mixture to room temperature; and wherein said crystallizable glass frit has a maximum particle size of substantially 2 mm and being substantially 90% by weight of said mixture and said silicate binder including waste glass powder having a maximum particle size of substantially 160 microns and being 10% by weight of said mixture, and further comprising the steps of adding to said mixture 5 ml of water-glass solution having a concentration of substantially 36° Bé and 5 ml water per 100 g of said mixture, shaping said mixture to form a plate, coating said plate, and melting said coated plate at a temperature of substantially 1,050° C.

4. A method of preparing a ceramic material comprising particles of a devitrified glass and silicate binder selected from the group consisting of water-glass and finely divided glass, comprising the steps of: forming a mixture of particles of crystallizable glass frit and said silicate binder having a melting point of between 950° and 1,100° C, heating said mixture to a temperature of between 950° and 1,100° C so as to melt said silicate and initiate a crystallization of said glass frit, and cooling the fired mixture to room temperature; and wherein said crystallizable glass frit has a maximum particle size of substantially 2 mm and being 70% by weight of said mixture, said binder including waste glass having a maximum particle size of substantially 160 microns and being 30% by weight of said mixture, and further comprising the steps of adding to said mixture a 5 ml water-glass solution having a concentration of substantially 36° Bé and 5 ml water per 100 g of said mixture, and further comprising the steps of shaping said mixture to form a plate, coating said plate with a zirconium oxide containing enamel having substantially 0.5% chromium oxide, and melting said plate at a temperature of substantially 1,050° C.

5. A method of preparing a ceramic material comprising particles of a devitrified glass and silicate binder selected from the group consisting of water-glass and finely divided glass, comprising the steps of:
 forming a mixture of particles of crystallizable glass frit and said silicate binder having a melting point of between 950° and 1,100° C;
 shaping said mixture of said glass frit particles and binder so as to obtain units of predetermined sizes;
 applying an enamel frit to said shaped units;
 heating said mixture to a temperature of between 950° and 1100° C so as to melt said silicate and initiate a crystallization of said glass frit; and
 cooling the fired mixture to ambient temperature.

6. A method of preparing a ceramic material comprising particles of devitrified glass and silicate binder selected from the group consisting of water-glass and finely divided glass, comprising the steps of:
 forming a mixture of particles of crystallizable glass frit and said silicate binder having a melting point of between 950° and 1,100° C;
 shaping said mixture of glass frit particles and binder to obtain units of predetermined sizes;
 applying a pigment suspension to said shaped units;
 heating said mixture to a temperature of between 950° and 1,100° C so as to melt said silicate and initiate a crystallization of said glass frit; and
 cooling the fired mixture to ambient temperature.

7. A method of preparing a ceramic material comprising particles of devitrified glass and silicate binder selected from the group consisting of water-glass and finely divided glass, comprising the steps of:
 forming a mixture of particles of crystallizable glass frit and said silicate binder having a melting point of between 950° and 1,100° C;
 adding a coloring substance to said silicate binder;
 heating said mixture to a temperature of between 950° and 1,100° C so as to melt said silicate and initiate a crystallization of said glass frit; and
 cooling the fired mixture to ambient temperature.

* * * * *